(12) United States Patent
Sciammarella et al.

(10) Patent No.: US 6,320,599 B1
(45) Date of Patent: *Nov. 20, 2001

(54) ZOOMING SCALE INDICATOR IN COMPUTER GRAPHICS

(75) Inventors: Eduardo Sciammarella; Tom Grauman, both of New York; Nghi Doan, Bronx, all of NY (US)

(73) Assignees: Sony Corporation, Tokyo (JP); Sony Electronic, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,665

(22) Filed: May 11, 1998

(51) Int. Cl.[7] ..................................................... G09G 5/00
(52) U.S. Cl. ......................... 345/667; 345/670; 345/671; 345/788
(58) Field of Search ..................................... 345/339, 342, 345/121–131, 341, 438, 439, 437, 973, 974, 133, 343, 667, 670, 671, 788, 660

(56) References Cited

U.S. PATENT DOCUMENTS

| 5,341,466 | * | 8/1994 | Perlin et al. ........................... 395/139 |
| 5,596,346 | * | 1/1997 | Leone et al. ........................... 345/127 |
| 5,818,455 | * | 10/1998 | Stone et al. ............................ 345/433 |
| 5,874,965 | * | 2/1999 | Takai et al. ............................ 345/357 |
| 5,880,709 | * | 3/1999 | Itai et al. ............................... 345/113 |
| 5,973,691 | * | 10/1999 | Servan-Schreiber .................. 345/342 |

* cited by examiner

Primary Examiner—Bipin Shalwala
Assistant Examiner—Mansour M. Said
(74) Attorney, Agent, or Firm—Frommer Lawrence & Haug LLP; William S. Frommer; Darren M. Simon

(57) ABSTRACT

As various objects, images, etc. are selectively enlarged or reduced in size on a screen using a zooming operation, at least three marks are displayed to provide a visual indication of the limits for zoom-in and zoom-out operations. The first and second marks indicate limits for enlarging and decreasing a picture, respectively, while the third mark indicates a position of the current screen display with respect to the displayed limits for the zoom-in and zoom-out operations.

11 Claims, 4 Drawing Sheets

ZOOMING SCALE INDICATOR IN COMPUTER GRAPHICS

BACKGROUND OF THE INVENTION

The invention is related to computer graphics and, in particular, a user interface using computer graphics for performing operations on a screen display.

A user interface provides, among other things, an interface between a computer user and an application program executing via an operating system of the computer. In the absence of a user interface, the computer user has to learn application program commands and/or operating system commands which often require some technical expertise and knowledge. Instead of entering line commands to run an application program, to add a peripheral device, to activate a "Web" browser to connect to the Internet's World Wide Web, etc., the user interface allows even a computer novice to carry out these and other operations on the computer with ease and simplicity.

It is well known that via the user interface the user can, for example, view, manipulate, etc. images and graphical objects on a display screen via an input device such a mouse, light pen, keyboard, joystick, etc. coupled to the computer. Various operations associated with the images and objects are available to the user. For example, by selecting ("clicking" on) a particular object ("icon") on the screen, the user may start running an application program, change a screen or a set-up configuration of the computer, manage files in various directories and sub-directories, etc. One of the operations that the user interface of an application program with graphical images may provide is a so-called "zoom" or "zooming" operation which is explained hereinbelow.

FIG. 1 shows a graphical universe 100 that is much larger than the display screen 102 of a computer monitor, television set, etc. The entire universe 100 may be available to the user for arranging, for example, various images/objects 104, 106, 108, 110 (as represented by icons) corresponding to application programs, images, files, etc. At a particular point in time, as shown in FIG. 1a, the user views only several objects 106, 108 at once. When the user wants to view the entire universe 100 on the display screen 102, all the objects 104, 106, 108, 110 in the universe 100 should "fit" on the display screen 102. To achieve this, he "zooms out" from his current display (picture) on the display screen 102. That is, the objects 104, 106, 108, 110 are reduced in size while maintaining their relative positions in the graphical universe 100, as shown in FIG. 1b. As further shown in FIG. 1b, the entire universe 100 appears on the display screen 102. Conversely, if the user is only interested in a detailed view of a particular object, he "zooms in" to the object-in-interest. That is, the object-in-interest (picture) is enlarged.

Several disadvantages, however, are associated with a conventional zoom operation. In particular, the user does not know whether either of the limits of zoom-in or zoom-out operation has been reached or where those limits are on the display screen. For example, when the user keeps zooming-in to the object or zooming-out from the object, he has no visual indication as to where the limits are or whether those limits have been reached whereby further zoom operations may be fruitless. In addition, the current size of objects on the display screen with respect to the upper (zoom-in) and lower (zoom-out) limits as provided by the computer system are not shown on the display screen, leaving the user to wonder about the extent of further zoom-in/out.

A need therefore exists for a user interface containing features which overcome the above-mentioned disadvantages and realize the criteria as discussed above.

OBJECTS OF THE INVENTION

It is an object of the present invention to provide a zooming scale indicator in computer graphics.

It is another object of the present invention to provide a visual indication of limits for zoom-in and zoom-out operations on the display screen.

It is a further object of the present invention to provide a visual indication of a current display with respect to limits for zoom-in and zoom-out operations on the display screen.

SUMMARY OF THE INVENTION

These and other objects, features and advantages are accomplished by apparatus for displaying a graphical space. The inventive apparatus includes a screen for providing a current display thereon and a programmable controller for selectively enlarging or reducing the current display on the screen. The programmable controller provides at least three marks on the screen. The first and second marks indicate corresponding limits for enlarging or reducing, respectively, the current display, and the third mark indicates a position of the enlarged or reduced current display with respect to the limits.

In accordance with one aspect of the present invention, the programmable controller is operative to move the third mark toward the first mark on the screen if the current display is enlarged. Conversely, the programmable controller is operative to move the third mark toward the second mark on the screen if the current display is reduced.

BRIEF DESCRIPTION OF THE DRAWINGS

The above-mentioned as well as additional objects, features and advantages of the present invention will become readily apparent from the following detailed description thereof which is to be read in conjunction with the accompanying drawings, in which.

In all Figures, like reference numerals represent the same or identical components of the present invention.

DESCRIPTION OF THE PREFERRED EMBODIMENTS

Figure 1A:
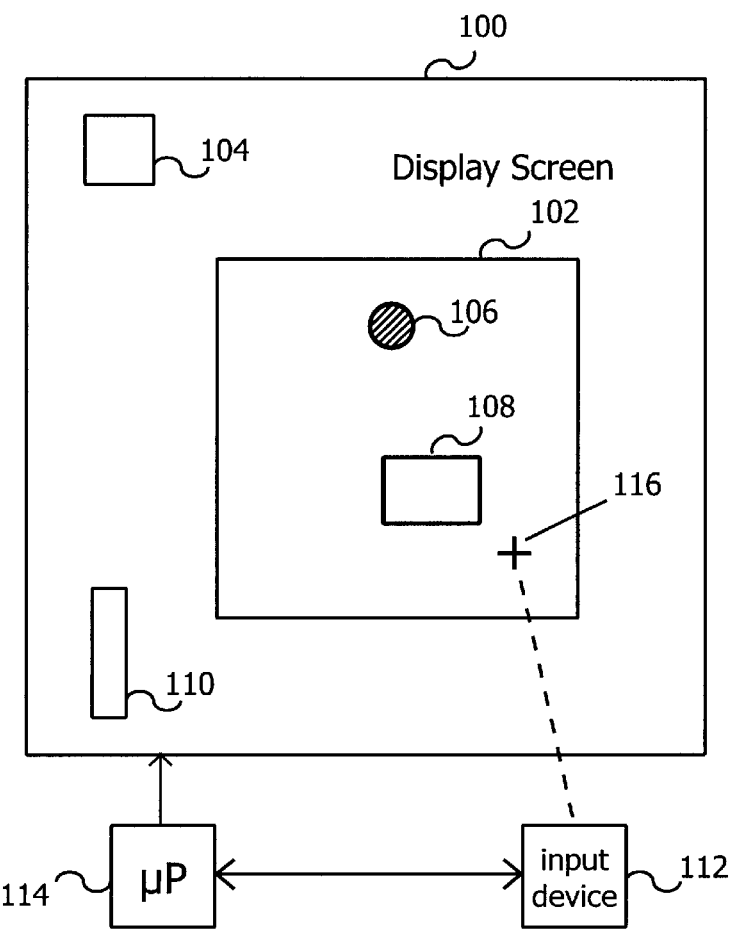
FIG. 1a shows a relationship between a graphical universe and a display screen.
Figure 1B:
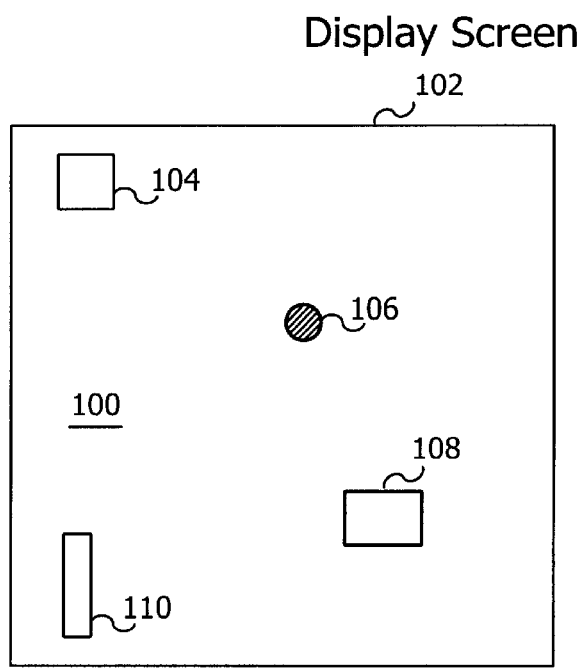
FIG. 1b shows the result of a zoom-out operation whereby the entire graphical universe is displayed on the display screen.

FIG. 1a shows the graphical universe 100 containing various graphical objects 104, 106, 108, 110 representing operations corresponding to each object. As mentioned above, such operations as starting an applications program, activating a modem, sorting files, etc. may be carried out by selecting (clicking on) a corresponding object. Also shown in FIG. 1a is the display screen 102. The user can view a portion of the universe 100 to perform the above-described operations using the objects 106, 108 in view. Alternatively, new objects may be created in the displayed portion of the universe 100, existing objects deleted or modified, etc.

FIG. 1a further shows a cursor 116 responsive to an input device 112, such as a mouse, operated by the user. The input device 112 is controlled by a microprocessor 114. The graphical operations associated with the graphical universe 100 and/or display screen 102 are carried out via the microprocessor 200.

Figure 2:
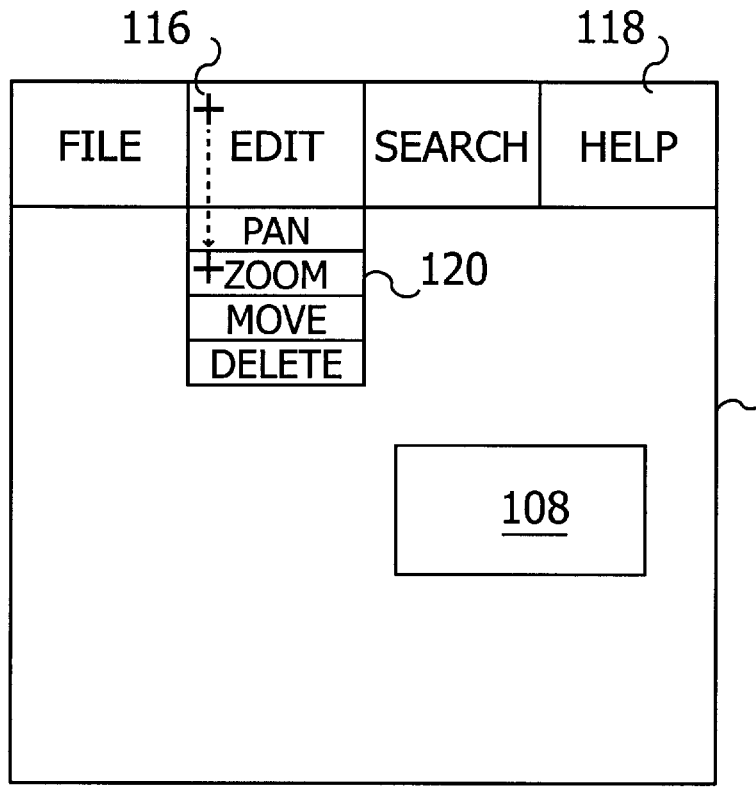
FIG. 2 illustrates a display screen with a toolbar for selecting a zoom operation according to one aspect of the present invention.

According to one aspect of the present invention, the user, via the input device 112, positions the cursor 116 on a portion 118 (a so-called toolbar) on the display screen 102 as illustratively shown in FIG. 2. From the toolbar, a zoom operation according to the present invention may be selected by moving the cursor 116 to an appropriate item in a pull-down menu, such as a sub-menu 120, and clicking on "ZOOM-IN" of the sub-menu 120, for example, as shown in FIG. 2.

Figure 3:
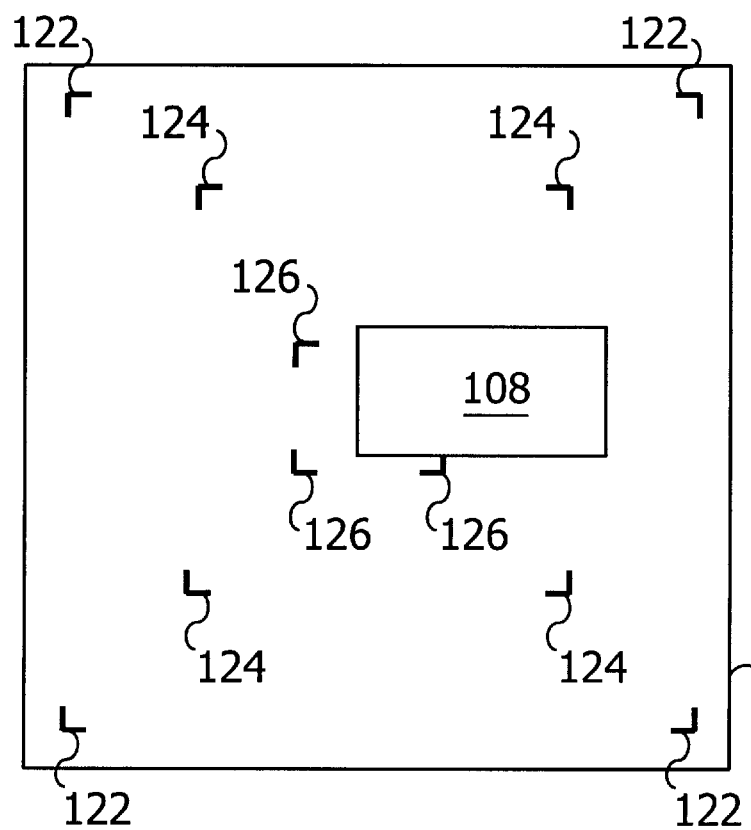
FIG. 3 illustrates three sets of marks when the zoom-in/out operation is selected in accordance with one embodiment of the present invention.

When the user selects the zoom-in or zoom-out operation, three sets of marks 122, 124, 126 are provided on the display screen 102 as shown in FIG. 3. The first set 122 is zoom-in marks which indicate a limit for the zoom-in operation on the display screen 102, and the second set 126 is zoom-out marks which indicate a limit for the zoom-out operation. The third set 124 is position indicating marks for providing a visual indication of the current position of the display screen 102 with respect to the marks 122, 126.

The position indicating marks 124 show on the display screen 102 where the current display is with respect to the zoom-in and zoom-out marks 122, 126. As shown in FIG. 3, the position indicating marks 124 appear between the upper limit (the zoom-in marks 122) and the lower limit (the zoom-out marks 126) for the zoom operation. When the user views objects (such as the object 108) on the display screen 102 during the zoom-in/out operation, he knows exactly how far the display is from the upper and lower limits of zooming.

Figure 4A:
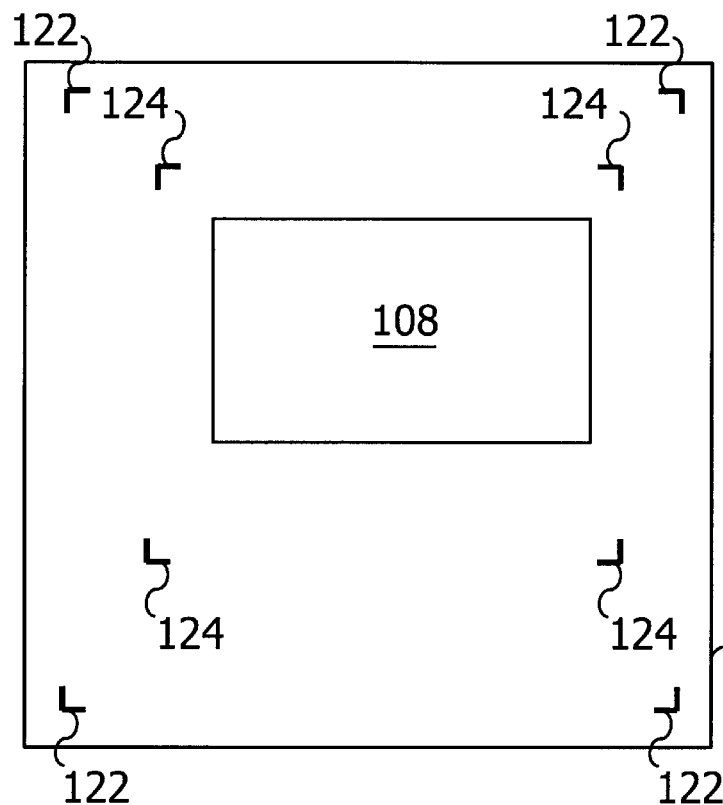
FIG. 4a shows how the position of the marks change during the zoom-in operation in accordance with the present invention.
Figure 4B:
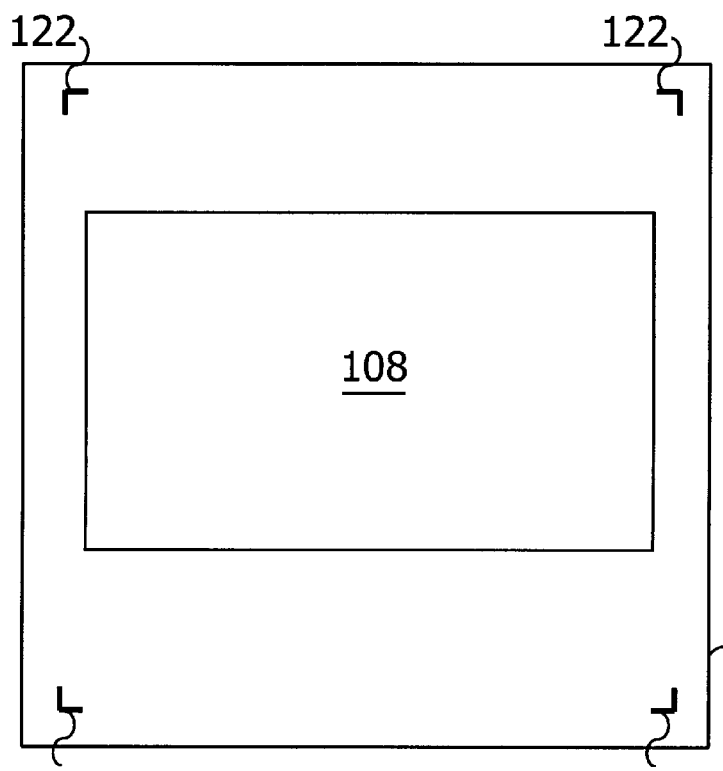
FIG. 4b shows a visual indication of the limit for the zoom-in operation in accordance with the present invention.

In operation, when the user selects the zoom operation, three sets of marks are provided on the display screen 102, namely the zoom-in marks 122, zoom-out marks 126, and position indicating marks 124. When the user zooms-in to the object 108, for example, the displayed picture is enlarged whereby the size of the object-in-interest (that is, the object 108) is increased. As illustrated in FIG. 4a, the display shows a more detailed view of the object 108. As further shown in FIG. 4a, the position indicating marks 124 move closer to the zoom-in marks 122 located on the display screen 102 for indicating the limit of the zoom-in operation. If the user further desires to view the object 108 in greater detail, he zooms-in and the position indicating marks 124 further move closer to the zoom-in marks 122. As long as the user continues to perform the zoom-in operation, the position indicating marks 124 will keep moving closer to the zoom-in marks 122 until the two sets of marks substantially coincide with each other as shown in FIG. 4b. At this point, the display screen 102 indicates that the zoom-in operation has reached its limit such that the user can turn his attention to other functions and/or operations, for example.

Figure 5A:
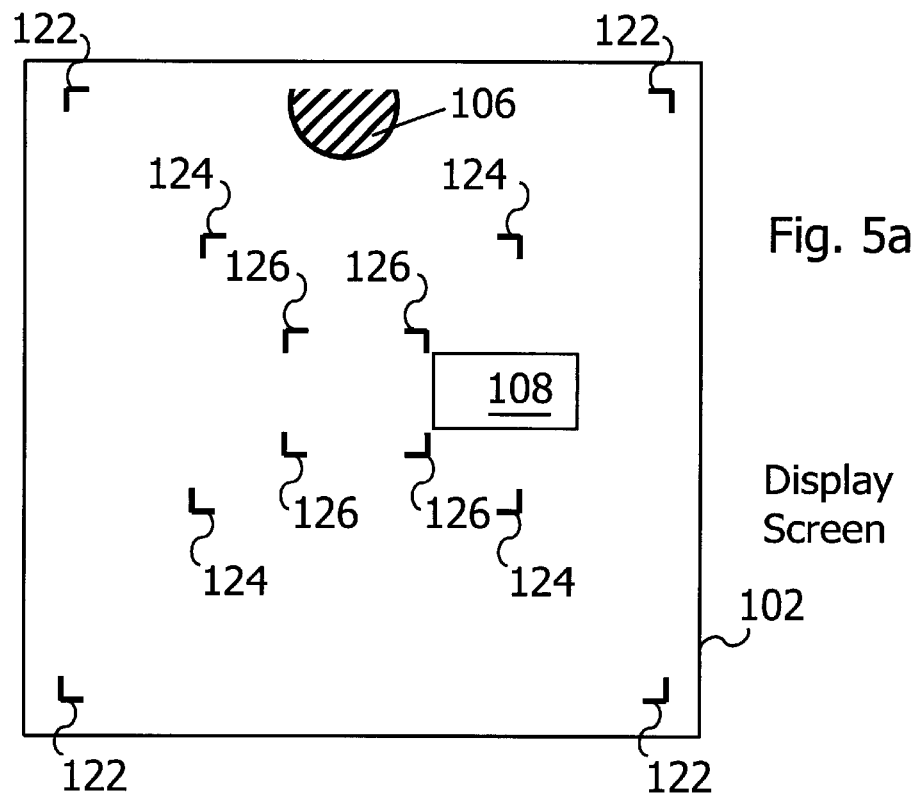
FIG. 5a shows how the position of the marks change during the zoom-out operation in accordance with the present invention.
Figure 5B:
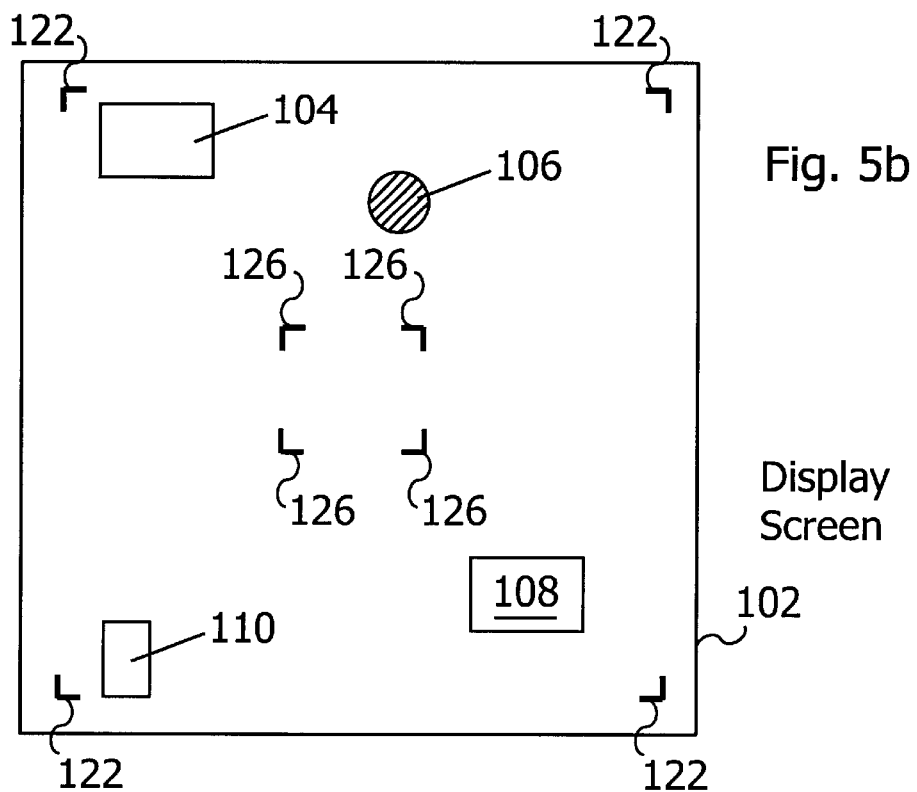
FIG. 5b shows a visual indication of the limit for the zoom-out operation in accordance with the present invention.

Similarly, when the user wants to view a larger portion of the universe or the entire universe 100, for example, he zooms-out from the current display. In this case, the position indicating marks 124 move toward the zoom-out marks 126 located in the center of the display screen 102, for example, as shown in FIG. 5a. As the user continues zooming-out further, the position indicating marks 124 continue moving closer to the zoom-out marks 126. As a result, the user knows how far the current display is from the zoom-out limit and whether the limit has been reached. Similar to the above, the position indicating marks 124 will keep moving closer to the zoom-out marks 126 until the two sets of marks substantially overlap as shown in FIG. 5b.

As is apparent from the above discussion, the position indicating marks 124 move between the zoom-in and zoom-out marks 122, 126, respectively, which set the boundary for the corresponding zooming operations. To help determine when the position indicating marks 124 substantially overlap or coincide with either the zoom-in or zoom-out marks, the position indicating marks 124 may be of different color than the zoom-in and zoom-out marks 122, 126, respectively. When the two sets of marks (the position indicating marks 124 and either the zoom-in or zoom-out marks 122, 126) substantially overlap, the display screen shows the same color of the marks as the position indicating marks 124, for example, in one embodiment of the invention.

To summarize, according to the present invention as the user (via the input device 112) desires either to view only several objects 104, 106, 108, 110 in detail or to view the entire universe 100, he zooms-in or zooms-out. The two sets of marks 122, 126 that appear on the display screen 102 indicate whether the limits for the zoom-in and zoom-out operations have been reached, and the third set of marks 124 displays the current position of the display with respect to the zoom-in and zoom-out limits.

The above-mentioned figures show the cursor 116 being manipulated by the input device 112 under control of the microprocessor 114 which is coupled to the display screen 102 and/or graphical universe 100. It will be appreciated that any other programmable controller may be programmed to carry out the operations of the present invention as described hereinabove with reference to those figures. The present invention may be implemented on a dedicated system having a screen for displaying graphical objects including text, images, etc., an input device for manipulating those objects on the screen, and at least one programmable controller for effecting various functions in the system. Alternatively, the above operations may be performed on a general-purpose personal computer programmed to perform the operations in accordance with the present invention and equipped with an input device such as a mouse, lightpen, touch-screen display, remote control device, etc., and a display monitor.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A method for displaying a graphical space on a screen, comprising the steps of:

providing a current display on said screen;

selectively enlarging or reducing said current display on said screen; and providing at least three marks on said screen such that said first and second marks indicate corresponding limits for enlarging and reducing, respectively, said current display, and said third mark indicating a position of the enlarged or reduced current display with respect to the limits; wherein said third mark is displayed between said first and second mark on said screen.

2. The method according to claim 1, wherein said third mark substantially overlaps on said current display said first mark or said second mark when the respective graphically displayed limit for enlarging or reducing, respectively, said current display on said screen has been reached.

3. The method according to claim 1, further comprising moving said third mark toward said first mark if said current display is enlarged.

4. The method according to claim 2, further comprising the step of moving said third mark toward said second mark if said current display is reduced.

5. The method according to claim 1, wherein said step of selectively enlarging or reducing is referred to as a zooming operation.

6. The method according to claim 5, wherein said zooming operation is selected from a menu displayed on said screen.

7. The method according to claim 5, wherein said zooming operation is controlled via an input device.

8. The method according to claim 1, wherein said first and second marks are displayed on said screen in a different color than said third mark.

9. Apparatus for displaying a graphical space, comprising:

a screen for providing a current display thereon; and a programmable controller for selectively enlarging or reducing said current display on said screen, said programmable controller providing at least three marks on said screen such that said first and second marks graphically display corresponding limits for enlarging or reducing, respectively, said current display, and said third mark graphically displays a position of the enlarged or reduced current display with respect to the limits displayed by said first and second marks; wherein said third mark is displayed between said first and second mark on said screen.

10. The apparatus according to claim 9, wherein said programmable controller is operative to move said third mark toward said first mark on said screen if said current display is enlarged.

11. The apparatus according to claim 9, wherein said programmable controller is operative to move said third mark toward said second mark on said screen if said current display is reduced.

* * * * *